US005236711A

United States Patent [19]

Ostby et al.

[11] Patent Number: 5,236,711

[45] Date of Patent: Aug. 17, 1993

[54] METHOD FOR PRESERVING WOODEN CROSS-TIE

[75] Inventors: David J. Ostby, Madison; John M. Conover, Brown Deer, both of Wis.

[73] Assignee: Osmose Wood Preserving, Madison, Wis.

[21] Appl. No.: 717,533

[22] Filed: Jun. 19, 1991

Related U.S. Application Data

[62] Division of Ser. No. 239,316, Sep. 1, 1988, Pat. No. 5,043,225.

[51] Int. Cl.$^5$ .............................................. A01N 25/08

[52] U.S. Cl. ...................................... 424/409; 238/29; 238/83; 238/84; 238/303; 238/304; 422/28; 422/40; 424/411; 424/414; 427/336; 427/440; 427/541

[58] Field of Search ....................... 424/409, 411, 414; 238/29, 83, 84, 303, 304; 427/336, 440, 541; 422/28, 40

[56] References Cited

U.S. PATENT DOCUMENTS

| | | | |
|---|---|---|---|
| 1,620,152 | 3/1927 | Curtin | 428/541 X |
| 2,656,116 | 10/1953 | Protzeller | 238/304 X |
| 3,306,765 | 2/1967 | Du Fresne | 428/541 |
| 4,731,267 | 3/1988 | Makus et al. | 428/35.5 |

*Primary Examiner*—Thurman K. Page
*Assistant Examiner*—Robert H. Harrison
*Attorney, Agent, or Firm*—Fulwider Patton Lee & Utecht

[57] ABSTRACT

A preservative-bearing pad and a method of using same to treat the interface between a railroad cross tie and tie plate. A sandwich of water-soluble active ingredient disposed between two layers of biodegradable hydrophilic backing is simply placed on the adzed portion of a cross tie prior to installation of the tie plate and rail during a rail laying or relaying operation.

6 Claims, 2 Drawing Sheets

METHOD FOR PRESERVING WOODEN CROSS-TIE

This is a divisional of copending application Ser. No. 07/239,316 filed on Sep. 01, 1988, U.S. Pat. No. 8,043,225.

BACKGROUND OF THE INVENTION

The present invention relates to a preservative-bearing pad and method of using same to preserve wooden railroad cross ties and more particularly pertains to a treatment of the interface between the tie and the rail supporting tie plate.

Wooden railroad cross ties are made decay resistant by forcing a material such as creosote into the wood cell structure under relatively high pressure. This protects the exterior wood layer but the interior is not penetrated by the creosote and is subject to attack by decay fungi whenever the exterior layer is split, cracked, abraded away or otherwise structurally compromised. Penetration of the treated exterior is common after extended service use as a result of weathering and also as a result of what is known as spike kill and plate cut.

Weathering typically causes weather checking in the form of splits or cracks running in the direction of the wood grain. These cracks provide passages for moisture to travel under the tie plate supporting the rail and into the tie spike holes and checks.

Spike kill is the mechanical enlargement of spike holes caused by cyclical train loadings on the rail, spike and tie plate, the relative movement between these components eventually enlarging the spike hole and exposing untreated tie wood. This relative movement also causes plate cut, which is the wearing or cutting away of the tie at the interface between the tie plate and tie. This action tends to abrade away the treated exterior wood layer and expose the tie interior to the intrusion of moisture and wind borne fungi spores.

Soon after railroad ties are put into service moisture sites become established, particularly in the central portion of the interface between the tie and tie plate. This central portion never seems to dry. As a consequence, the presence of moisture and the temperature elevation brought on by exposure to the sun serve as an incubator for the growth of decay fungi. The natural balance of food, moisture and temperature accelerates destruction of the wood cells and exaggerates spike kill and plate cut in a cycle which eventually results in premature failure and costly replacement of the ties.

A variety of approaches have been taken in the prior art to extend the service life of wooden supports such as power poles or railroad cross ties. One area of concentration focuses on the formulations with which the wood is initially treated. U.S. Pat. No. 4,335,109 for example describes a composition which enhances the water repellency of the wood, while U.S. Pat. No. 1,620,152 provides a formulation with augmented fungicidal properties. Other efforts concentrate on the method of pretreatment to provide processes which force various preservative solutions deeper into the interior of the wood. U.S. Pat. No. 1,936,439 for example, describes a process in which ties are cross-drilled prior to impregnation with creosote under heat and pressure. The process of U.S. Pat. No. 4,202,494 encases a cross tie in polypropylene. These methods have the inherent disadvantage in that they do not lend themselves to the in situ treatment of railroad cross ties. U.S. Pat. No. 1,388,877 provides for the formation of a cavity within the wood structure that functions as a refillable reservoir for preservative solutions. While this reservoir may be filled or refilled in the field, the initial boring must be done prior to installation.

Other methods focus on the treatment of wood already installed or already in service and perhaps even already somewhat decayed. U.S. Pat. No. 4,048,353 and No. 4,269,875 describe methods by which railroad cross ties are bored and treated while U.S. Pat. No. 4,738,878 provides a process for injecting a preservative into the especially vulnerable area between the tie and tie plate. This latter method actually relies on existing cracks and fissures to promote a deeper penetration of preservative into the wood. The disadvantages associated with these methods is that they involve labor intensive operations and require special tools and equipment.

Another type of approach more commonly employed in the treatment of power poles involves the application of a wrap or bandage onto the surface of the wood. These wraps typically consist of a multi-layer structure including a layer of preservative engorged material, a moisture barrier and perhaps a strength imparting layer that holds the whole bandage together. U.S. Pat. No. 3,467,490 and U.S. Pat. No. 3,420,617 are representative examples of such technology. The disadvantages associated with this type of preservative treatment is the relatively high cost of manufacture of the bandages and the fact that the inert elements remain long after the active ingredients have been expended as these elements are not biodegradable. In addition, the prior art bandages are relatively thick and often bulky.

SUMMARY OF THE INVENTION

The general purpose of this invention is to provide a method of preserving the especially vulnerable area of a railroad cross tie near the interface of the tie and the tie plate without the disadvantages associated with the above described methods. To attain this purpose the invention provides a thin preservative-bearing pad that is placed between the cross tie and the tie plate either at the time of the original laying of rail or during any subsequent relaying. No extra equipment is needed and only a negligible amount of labor is required to simply place the pad on the adzed surface of the cross tie prior to the mounting or remounting of the rail. The presence of the pad poses absolutely no resistance to the subsequent driving of the spikes into the tie and is thin enough so as not to pose any rail alignment problems. The use of the pad relies on the omni-present moisture found under the tie plate to leach the active ingredients out of the pad and help diffuse them throughout the adjacent section of wood. In addition, the unloading and loading of the tie plate by the passing of a train forces moisture into and out of the pad to further promote the leaching action. The inert components of the pad are completely biodegradable and will not pose an environmental problem at the end of the pad's service life.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference manuals designate like parts throughout the figures thereof and wherein.

DETAILED DESCRIPTION OF A PREFERRED EMBODIMENT

Figure 1:
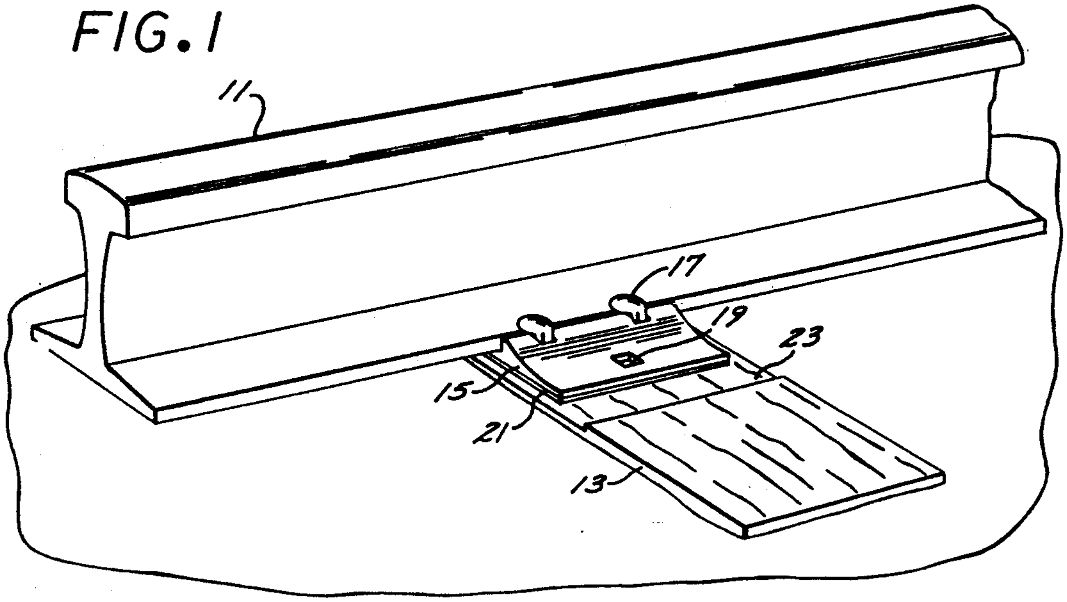
FIG. 1 is a perspective view of the pad of the present invention in its installed position.
Figure 2:
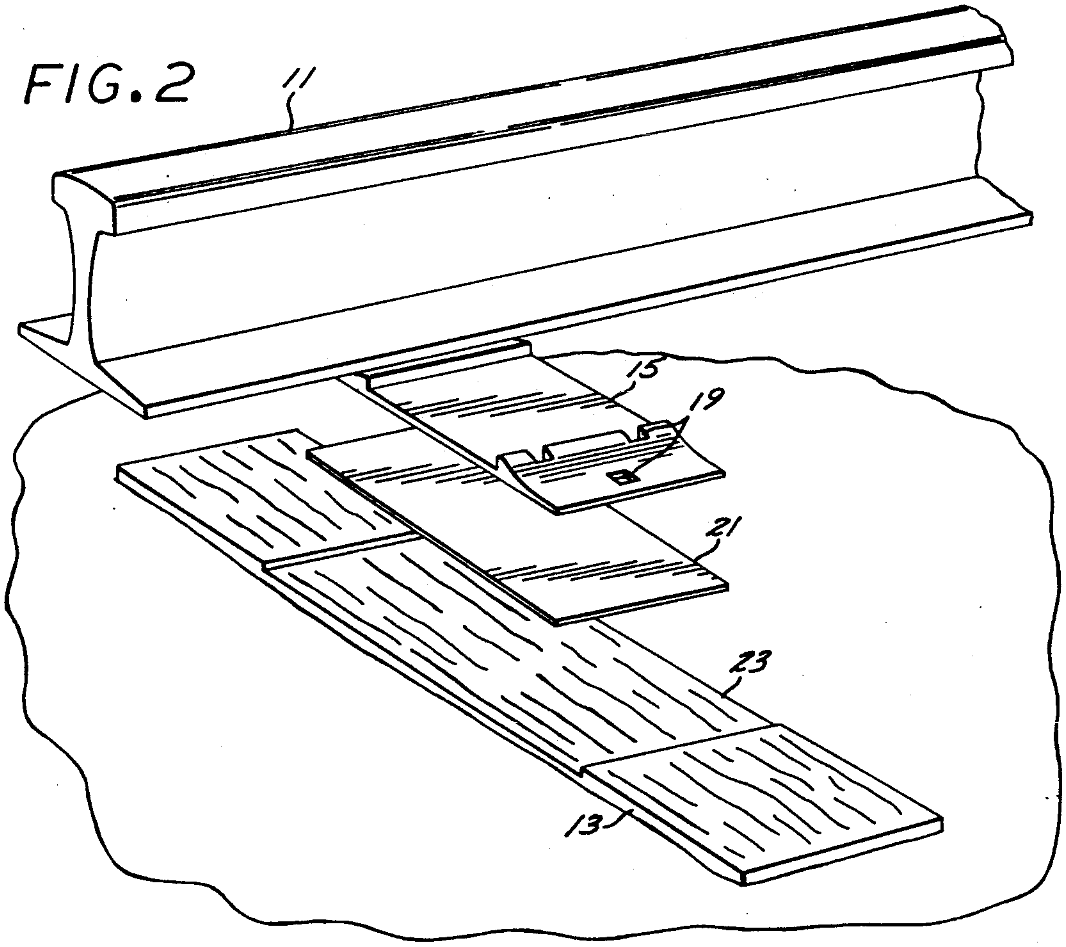
FIG. 2 is an exploded perspective of FIG. 1.
Figure 3:
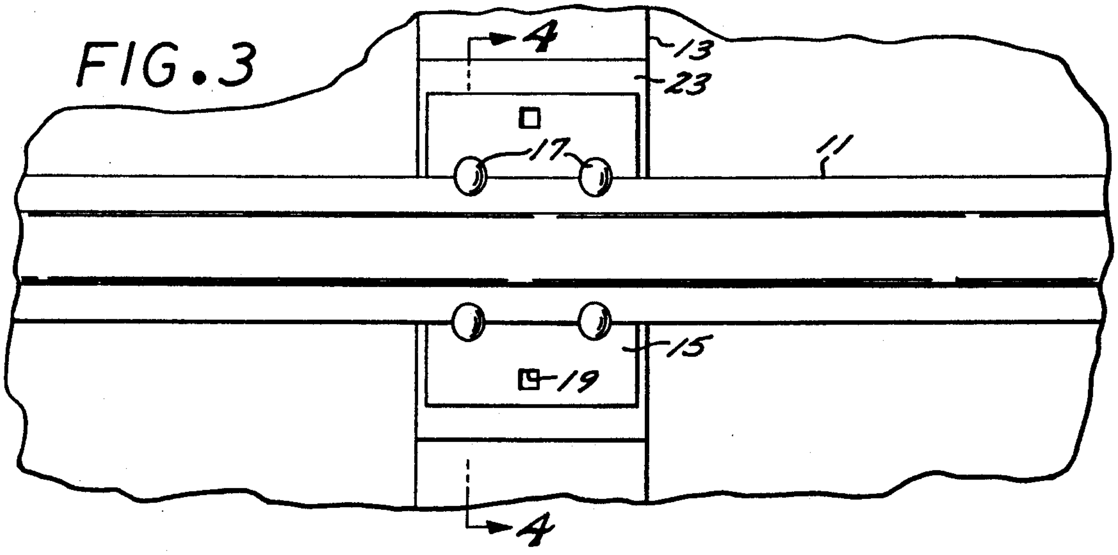
FIG. 3 is a top plan view of FIG. 1.

Reference is made to FIGS. 1-4 which generally illustrate the manner in which a rail 11 is affixed to a cross tie 13 and the placement of the preservative bearing pad 21 of the present invention. After placement of a tie 13, a section 23 thereof is adzed so as to provide a smooth and level surface for the support of the rail. A tie plate 15, having a plurality of holes 19 therein, is placed on the tie 13 after which the rail is lowered thereon. Conventional practice is to drive spikes 17 through two holes located diagonally on either side of the rail 11. The empty or unoccupied spike holes are available for use in the event that the originally placed spikes 17 become loosened through spike kill. In that event, additional spikes would be driven into originally unoccupied spike holes. The drawing figures illustrate an arrangement employing four spikes, two spikes on either side of the rail, with two extra holes remaining.

The thin preservative bearing pad 21 of the present invention is placed directly on the adzed surface of the tie 13 prior to placement of the tie plate 15 and subsequently offers no resistance when the spikes 17 are driven therethrough into the tie.

The pad 21 consists of a suspension of a water-soluble active ingredient in a binder sandwiched in between two layers of very thin hydrophilic paper backing. Sodium fluoride has been found to be an especially effective fungicide, is water soluble and therefore a preferred active ingredient of the present invention. A matrix of latex or in the alternative, sodium silicate offers excellent binding properties, is water soluble, capable of supporting a substantial amount of sodium fluoride and therefore either is well suited as a binder for the present invention. A ratio of sodium fluoride to binder of from 2.3:1 to 3.0:1 by weight provides the desired properties for this application. It has been found that an admixture of approximately 72% by weight sodium fluoride and approximately 28% by weight binder yields an ideal mass that is particularly easily retained between two layers of thin paper backing and provides the proper leach rate, given the amount of moisture normally available between the cross tie and tie plate. It has further been found that 0.018" paperboard is a suitable backing material, allowing water to freely pass therethrough and providing sufficient strength to maintain the integrity of the pad during its handling prior to its installation. The length and width of the pad 21 roughly corresponds to the size of the tie plate while its thickness measures between 1/16 and ⅛ of an inch.

Figure 4:
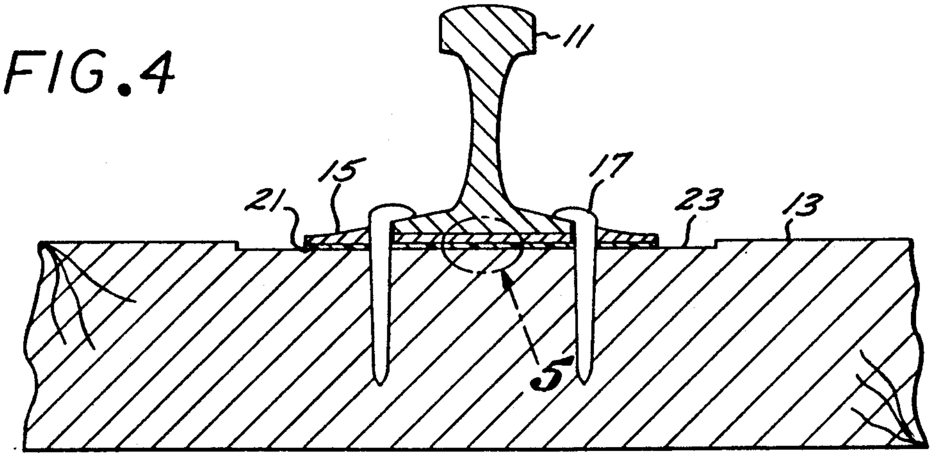
FIG. 4 is a cross-sectional view of FIG. 4, along lines 4—4.
Figure 5:
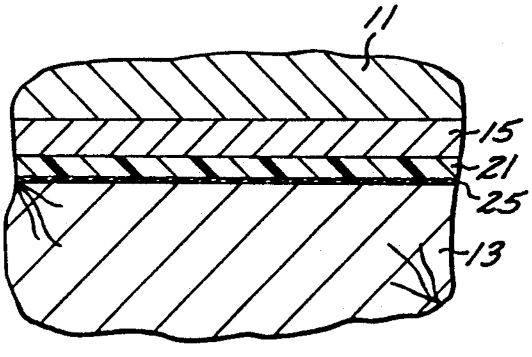
FIGS. 5 and 6 are an enlargement of the circled portion of FIG. 4.
Figure 6:
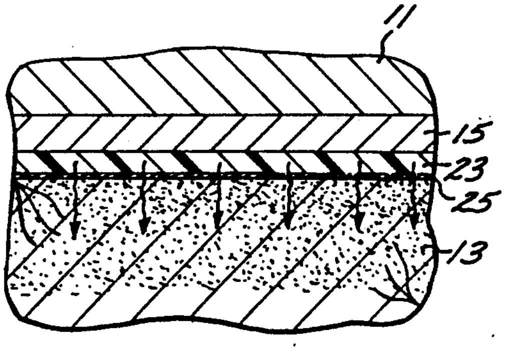

FIGS. 5 and 6 show enlarged cross-sectional views of the encircled area of FIG. 4 and particularly illustrate the positioning of the installed pad 21. Since the preservative is sandwiched between two identical backings, either surface can be placed in contact with the wood. As moisture 25 accumulates between the tie plate 15 and cross tie 13 it proceeds to seep through the hydrophilic paper backing into the interior of the pad where it then dissolves sodium fluoride. Once in solution, osmotic pressures will serve to transport (as indicated by the arrows in FIG. 6) sodium fluoride to areas of lesser concentration, i.e. the interior of the wood. As spike holes become enlarged as a result of the spike kill process described above, fungicide-laden moisture has access to even deeper recesses within the wood. The loading and unloading of the rail 11 caused by the passing of a train will serve to pump water into and out of the pad thereby expediting the dissipation of fungicide into the cross tie.

It is intended that the pad of the present invention be installed during the initial laying of the track or during any subsequent relaying operations. After the passage of time, the action of the water underneath the tie plate 15 will serve to transport away the entire mass of active ingredient. The remaining paper backing is soon completely degraded, either by the physical forces acting thereon, as for example the abrading action of the shifting tie plate 15 during the movement of a train, and ultimately through its consumption by ambient biological organisms. This degradabililty precludes any disposal problems of exhausted pads during subsequent relaying operations.

The typical chronology of events depending of course on the actual conditions encountered, is that the sodium fluoride is completely transfered from between the paper backing to the wood within a few months wherein it remains toxologically active for up to about 5 years. The paper backing degrades within 8 to 24 months of installation while track is relayed at time intervals anywhere from 5 to 30 years.

Various modifications and changes may be made with respect to the foregoing detailed description without departing from the scope of the present invention.

what is claimed is:

1. A method of preserving the wood near the interface of the adzed surface of a wooden railroad cross-tie and a tie plate during a rail laying or re-laying operation, the cross-tie and tie plate being exposed to moisture during railroad operations, said method comprising:
   - providing a pad generally corresponding in size to said adzed surface, said pad consisting of a suspension of a water-soluble fungicide in a binder sandwiched between two layers of a porous hydrophilic backing material, said fungicide leaching from said pad at a controlled rate when water contacts said pad;
   - placing the pad on the adzed surface;
   - positioning the tie plate and rail on the adzed surface; and
   - driving the spikes through the tie plates into the cross-tie, with the spikes forming spike holes in the cross-ties whereby said fungicide is transported to the interior of the cross-tie through the spike holes by osmotic pressures and cyclical loading and unloading of the rial caused by the passing of a train expediting dissipation of the fungicide into the cross-tie, said pad being degraded as the fungicide is leached therefrom to thereby facilitate replacement of the pad by a similar pad during subsequent rail relaying operations.

2. A method as set forth in claim 1 wherein said fungicide comprises sodium fluoride.

3. A method as set forth in claim 1 wherein said fungicide is suspended in a latex matrix material.

4. A method as set forth in claim 2 wherein said fungicide is suspended in a latex matrix material.

5. A method as set forth in claim 1 wherein said fungicide is suspended in a sodium silicate matrix material.

6. A method as set forth in claim 2 wherein said fungicide is suspended in a sodium silicate matrix material.

* * * * *